Feb. 4, 1964     W. B. SCHELL ETAL     3,120,460
METHOD AND APPARATUS FOR TREATING ABUTTING
SUCCESSIVE LENGTHS OF PIPE
Original Filed May 2, 1958     7 Sheets-Sheet 1

Fig. 1

William B. Schell
James C. Peek
INVENTORS

BY
ATTORNEYS 3,120,460
METHOD AND APPARATUS FOR TREATING ABUTTING SUCCESSIVE LENGTHS OF PIPE
William B. Schell and James C. Peek, Houston, Tex., assignors, by mesne assignments, to Pipe Line Service Corporation, a corporation of New Jersey
Continuation of application Ser. No. 732,643, May 2, 1958. This application Sept. 5, 1961, Ser. No. 155,224
(Filed under Rule 47(b) and 35 U.S.C. 118)
11 Claims. (Cl. 156—187)

The present invention relates to pipe treating apparatus and methods and, more particularly, to the coating, wrapping and other treatment of pipe as it is fed helically through a pipe treating station.

This application is a continuation of our copending application Serial No. 732,643 filed May 2, 1958, now abandoned, for Pipe Treating Apparatus and Method.

It is common practice to coat pipes for several reasons. For example, in laying pipe lines, ordinarily, the pipe is coated and wrapped with suitable materials to prevent corrosion. Previous practices of coating or wrapping pipe or both comprised placing the pipe on a conveyor which passed between a pair of rolls or some means for imparting a spiraling motion to the pipe as it passed through a coating and wrapping station. In order to continue the rotation, once the trailing end of the pipe passed the rotating means, it was necessary to couple the trailing end of the pipe with the leading end of the next succeeding section of pipe so that rotation would be imparted until the trailing end was completely through the coating and wrapping station. This is disadvantageous in that the couplings placed in the ends of the pipe chew up or damage the inner ends of the pipe. This causes turbulence when in use which causes the pipe to corrode or to be eaten away at these ends. Also, a considerable amount of manpower is required to insert and remove the couplings from the pipe which required a great deal of time. In large diameter pipe, for example 36 inch pipe, these couplings weigh from about 700 to 1200 pounds and it is apparent that this poses a considerable problem.

The present invention is directed to an improved apparatus for and method of treating pipe, either by coating or wrapping or both, in which the use of couplings to impart the spiraling motion to the pipe are completely eliminated. This, or course, advantageously avoids any damage to the ends of the pipe and eliminates turbulence and corroding or eating away of the pipe due to damage, considerably speeds up the operation, and eliminates a considerable amount of manpower. For example, the coating and wrapping process in a plant constructed according to the present invention has increased the capacity of coating and wrapping pipe from about one-third to one-half with a reduction of about fifty percent (50%) manpower.

Accordingly, it is a general object of the present invention to provide a pipe treating apparatus and method which eliminates the necessity of utilizing couplings or plugs in the ends of the pipe for imparting rotation to the pipe when it passes through the treating station where the pipe is either coated, wrapped or otherwise treated.

Yet a further object of the present invention is the provision of an improved pipe treating apparatus and method in which the inner ends of the pipe are not damaged during coating, wrapping and otherwise treating the pipe and in which capacity is increased and manpower requirements are materially reduced.

Yet a further object of the present invention is the provision of a pipe treating apparatus and method in which pipe is rotated from the trailing end by suitable rotating means, and, when the pipe is no longer rotated by this rotating means, the leading end of the pipe is rotated to complete the coating, wrapping or otherwise treating of the pipe.

Still a further object of the present invention is the provision of a pipe treating apparatus and method in which lengths of pipe are conveyed through a treating station in abutting end to end relationship, the next succeeding length of pipe providing the drive for completing the movement of the pipe being treated through the treating station while the pipe being treated is rotated by suitable means at its leading end.

Still a further object of the present invention is the provision of a suitable carriage having power driven pipe engaging means synchronized with the rotating means on the rearward side of the treating station for engaging and rotating the pipe and particularly the leading end of the pipe after the trailing end leaves the rearward rotating means and is passing through the treating station.

Still a further object of the present invention is the provision of a rearward carriage disposed for movement forward of the treating station and which includes rollers for engaging the trailing end of the pipe, which rollers are expansible so that the treating material will not fall on the rollers thereby avoiding clogging of the rollers with the treating material.

Still another feature of the present invention is the provision of a pipe coating apparatus and method in which pipe is continuously and spirally fed through the treating station and treated without utilizing coupling elements to couple them together.

Other and further objects, features and advantages will be apparent from the following description of presently preferred apparatus and methods of the invention, given for the purpose of disclosure. A presently preferred apparatus of the invention is illustrated in the accompanying drawings, where like character references designate like parts throughout the several views, and where:

FIGURE 3 is a side elevational view of the forward carriage;

Figure 1:
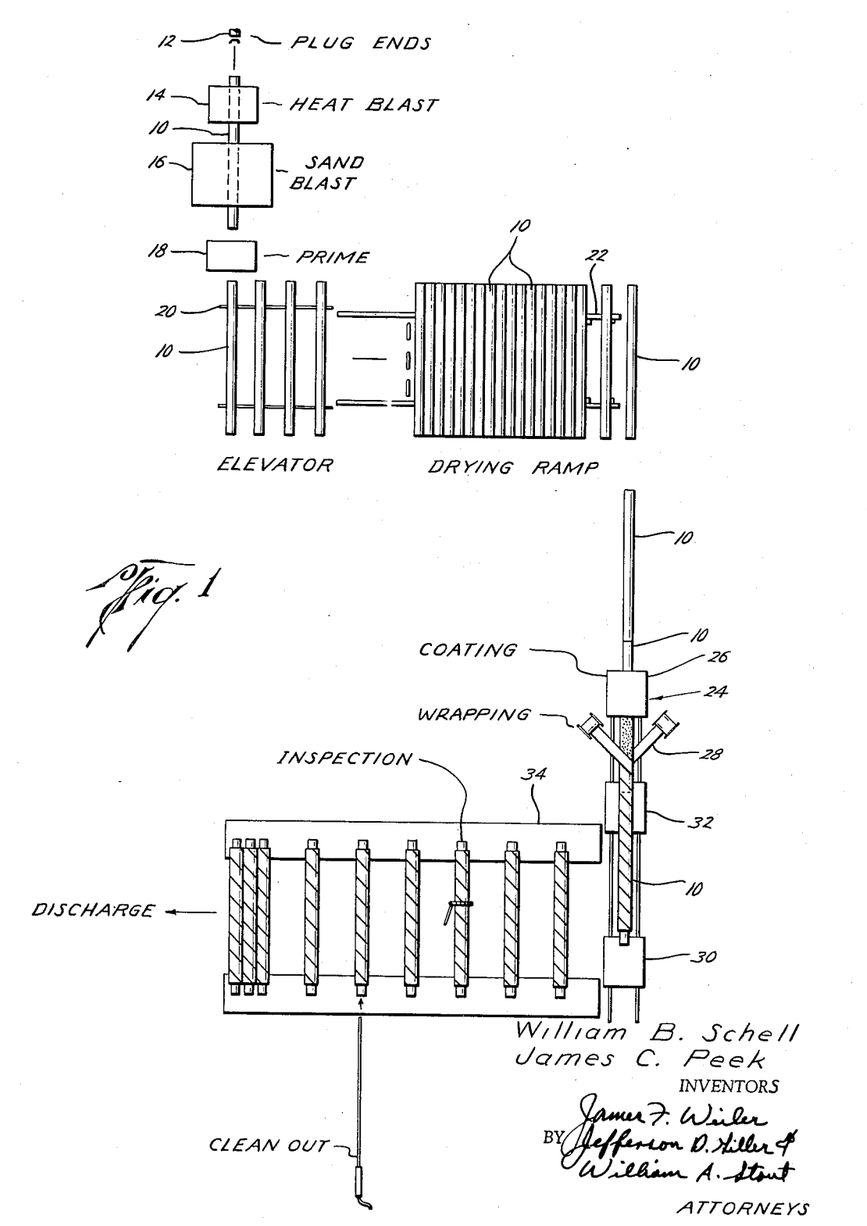
FIGURE 1 is a schematic diagram illustrating pipe treating apparatus constructed according to the invention and useful in the method of the invention.

Referring now to the drawings, and particularly to FIGURE 1, pipe 10 to be treated has its ends plugged by the plugs 12 during the cleaning step of the pipe, for example, when passing through the heat blast station 14 and the sand, shot or grit blasting station 16. These plugs are merely for the purpose of preventing material from entering into the pipe while it is being cleaned. Suitable conveyors, which are conventional, continuously feed the pipe 10 through the heat blasting and sand, shot or grit blasting stations 14 and 16, respectively, through the priming station 18 to a pipe elevator 20 where the pipe 10 is elevated to a drying ramp 22 where it is dried, the plugs 12 removed and the pipe is ready for coating, wrapping or otherwise treating.

The pipe 10 is then conveyed to the treating station, generally designated by the reference numeral 24, which here includes coating assembly 26 and wrapping assembly 28.

What might be termed a forward carriage 30 engages the leading end of the pipe 10 as it emerges from the treating station and rotates it, as hereinafter described, and a rearward carriage 32 engages the trailing end of the pipe 10 so that it is transported to the inspection and discharge ramp 34.

Conventional pipe conveyors convey the pipe 10 from the drying ramp 22 to the treating station 24. Once the trailing end of the pipe 10 has passed the means for rotating it, it is rotated by means on the forward carriage 30, as presently described, and is pushed completely through the treating station by the next succeeding length of pipe which abuts it in end to end relationship.

Thus, a continuous pipe treating apparatus and process is provided in which it is unnecessary to use coupling elements in order to obtain the necessary rotation and movement of the pipe through the treating station 24.

The heat blasting station 14, sand, shot or grit blasting means 16 and primer means 18 are all conventional and, accordingly, no detailed discussion thereof is deemed necessary or appropriate and is omitted in order to avoid unduly complicating the disclosure.

Figures 2, 3:
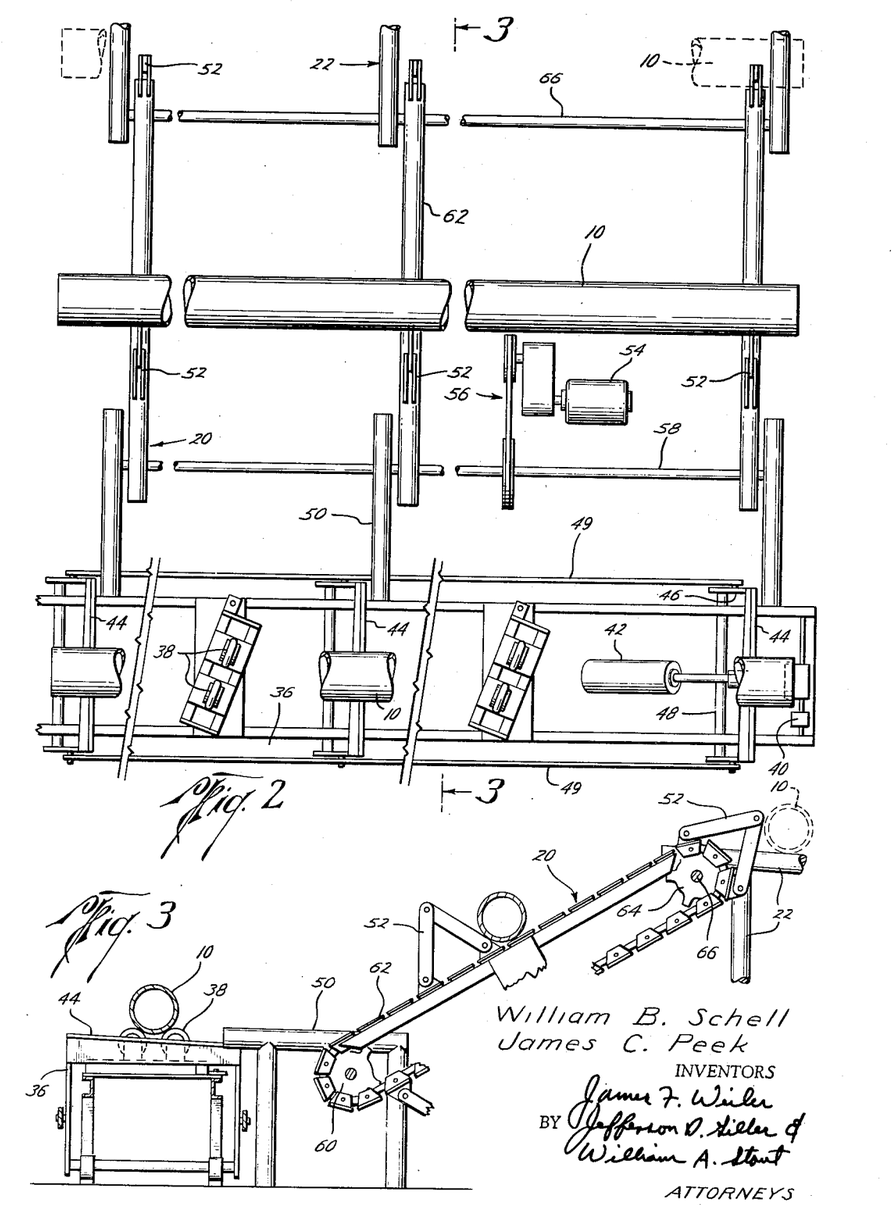
FIGURE 2 is a detailed plan view of the elevator and drying ramp illustrated in FIGURE 1.
FIGURE 3 is a cross-sectional view taken along the line 3—3 of FIGURE 2.

Referring now to FIGURES 2 and 3, a particularly advantageous and suitable elevator is illustrated for elevating the pipe to the drying ramp after it has been heat blasted, cleaned, and primed.

A conveyor 36 for the pipe 10 is illustrated which has the driven rollers 38 for causing movement of the pipe 10 adjacent to the elevator 20. A control valve 40 is provided for controlling the pneumatic or hydraulic ram arrangement 42 so that when the end of the pipe 10 strikes this control valve, the cross members 44 are elevated, which cross members 44 are secured by the crank arms 46 to the shafts 48 rotatably journaled in the conveyor frame 36. As illustrated, three such cross members 44 are utilized, although any desired number may be utilized, which are all secured together and moved in unison by means of the link arms 49.

Thus, upon engagement of the end of the pipe 10 with the control valve 40 the pneumatic or hydraulic ram is actuated causing the cross members 44 to be elevated and raise the pipe 10 off the conveyor rollers 38 onto the pipe rack 50 adjacent to the elevator 20.

After the pipe 10 rolls onto the pipe rack 50 it is engaged by the chain type elevators 62 which include the lift arms 52 spaced thereon which engage the pipe 10 and lift it to the drying ramp 22.

As best seen in FIGURE 2, three such chain elevators 62 are utilized which are driven by the prime mover 54, the belt drive assembly 56, the driven shaft 58 to which are journaled the sprockets 60 engaging the chain type belt 62 to which the lift arms 52 are connected.

The upper end of the elevator has a similar pair of sprockets 64 secured to the shaft 66.

Note that the generally triangularly shaped lift arms 52 engage the underside of the pipe 10 on the pipe rack 50, elevate it to the drying rack 22 and push it off the elevator belt 62 onto the drying ramp 22.

While any suitable elevator may be used in the present pipe coating apparatus and method, the elevator illustrated and described is particularly advantageous and suitable in that it permits continuous movement of the pipe from the heat blasting and cleaning stations through the drying, treating and discharge stations making a fully continuous process and apparatus.

No particular description is given of the control valve 40 and pneumatic or hydraulic ram assembly 42 as any suitable and preferred controls and means may be utilized for causing an elevation of the cross members 44 to elevate the pipe 10 from the conveyors 36 onto the rack 50.

The pipe 10 is permitted to remain on the drying ramp until dry and, in actual practice, the time that the pipe is placed on the ramp and moved to the point where it is conveyed to the treating station is such that the pipe is completely dried before it is conveyed to the treating station 24. While not shown, suitable drying means, heaters and the like may be utilized in connection with the drying ramp and drying step of the process.

Figure 4:
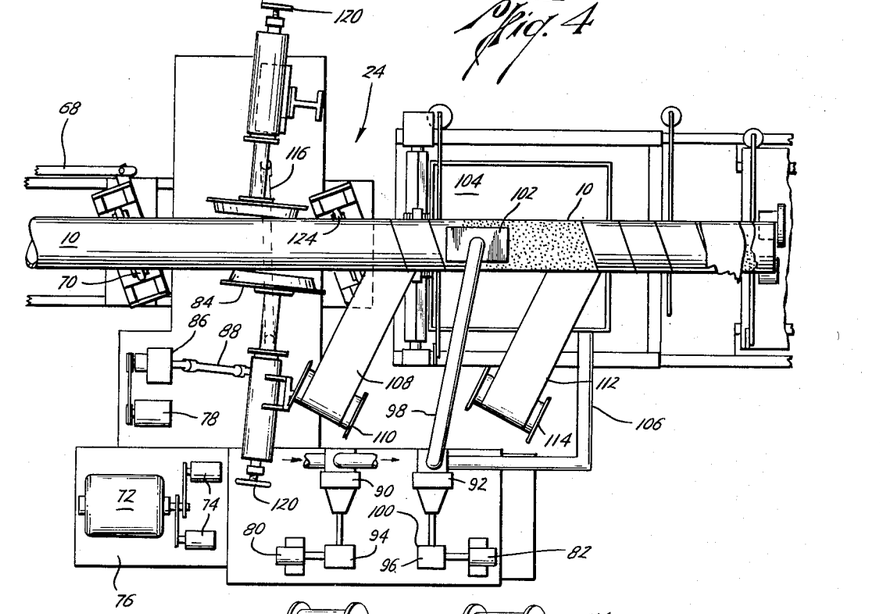
FIGURE 4 is a fragmentary, enlarged plan view illustrating the coating and wrapping station of FIGURE 1.
Figure 5:
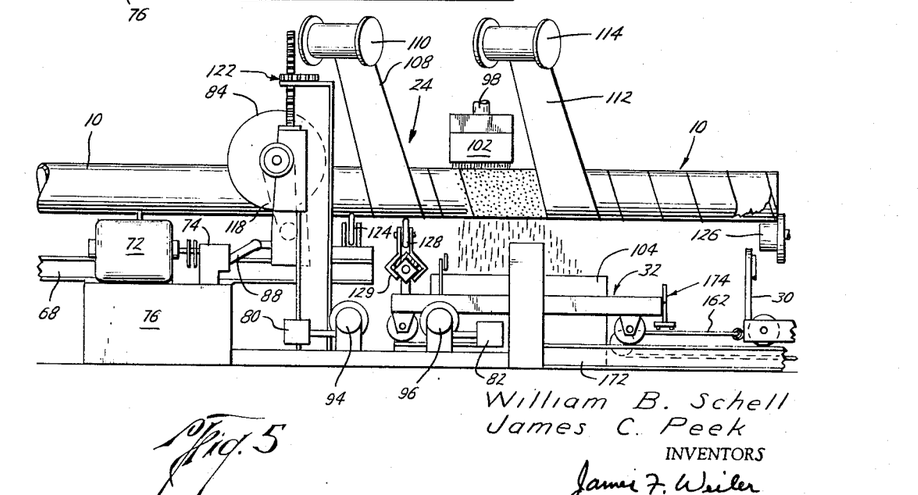
FIGURE 5 is a side elevational view of the coating and wrapping station illustrated in FIGURE 4.

Turning now to FIGURES 4 and 5 a pipe coating and wrapping station 24 is illustrated in detail. A conveyor 68 having the driven wheels 70 conveys the dried pipe 10 to the coating and wrapping station 24 similar to the conveyor 36 conveying the pipe to the elevator 20. Since any desired conveying means for moving the pipe forwardly may be utilized, and such conveyors are conventional, no detailed description thereof is deemed necessary.

A prime mover 72, such as an electric motor, is provided which drives the hydraulic pumps 74 disposed upon the hydraulic tank 76 for the purpose of providing hydraulic power to the hydraulic motors 78, 80 and 82. The hydraulic motor 78 drives the discs 84 which engages and rotates the pipe 10 through the treating station 24 by means of the transmission 86 and drive linkage 88. The hydraulic motors 80 and 82 drive the coating material pumps 90 and 92, respectively, for applying coating to the pipe 10, through the speed reducers 94 and 96, respectively. The pump 82 pumps the coating material through the pipe 98 from the tank 100 to the head 102 where it is applied to the pipe 10, the excess falling into the sump 104 and returned through the pipe 106 to the coating tank 100.

In the arrangement illustrated, two different wrappings are being applied, one a fiber glass material 108 from the roll 110 and an outer wrapping 112 from the roll 114.

The discs 84 preferably have a friction material, such as rubber, to engage the pipe 10 and rotate it and move it through the pipe treating station 24. As illustrated, suitable drive linkage 116 and 118 is provided to transmit rotational force to the discs 84 and these are adjustable both inwardly and outwardly by means of the adjustment wheels 120 and 122 for various sized pipe. Since these elements are all conventional, no detailed description thereof is deemed necessary.

A pair of idler rollers 124 are provided on the forward side of the discs 84 to help support the pipe 10 as it emerges, and it is noted that the pipe 10 also engages the power driven rollers 126 on the forward carriage 30 and the idler rollers 128 on the rearward portion of the rearward carriage 32. As will be described in greater detail later, at least one of the rollers 126 are driven at the same rate of speed or synchronized with respect to the rotation imparted by the discs 84 so that after the trailing edge of the pipe 10 passes the discs 84, the pipe is rotated from its forward end by the power driven rollers 126.

Figure 8:
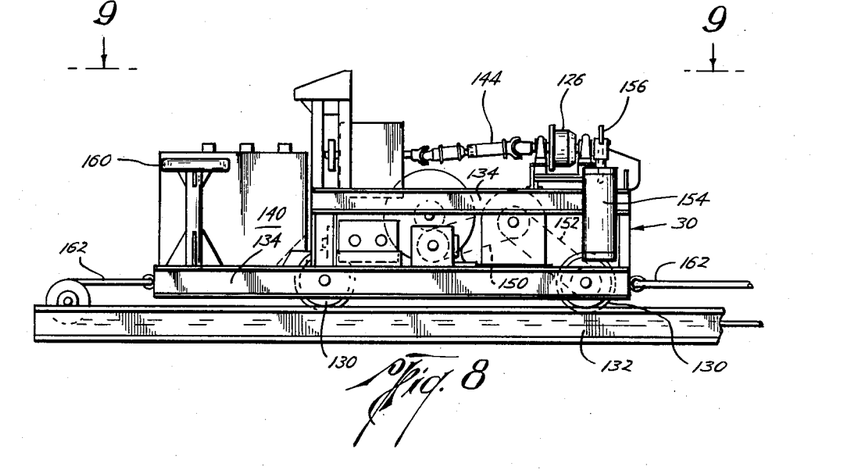
Figure 9:
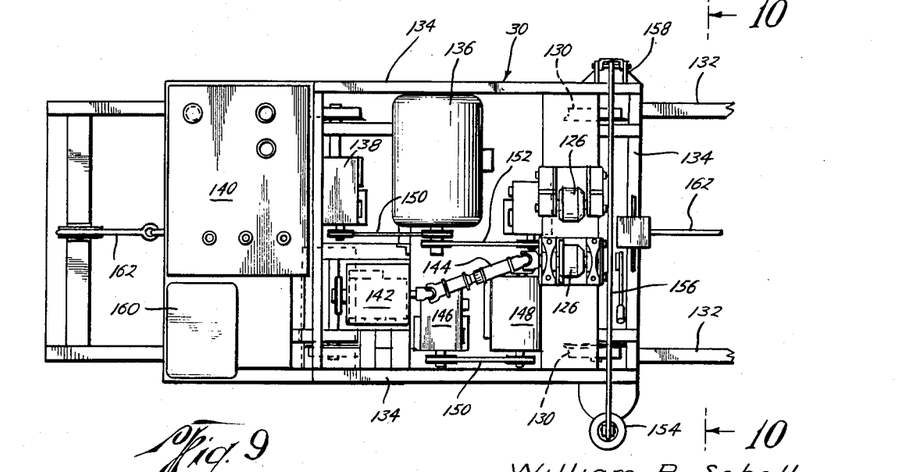
FIGURE 9 is a plan view taken along the line 9—9 of FIGURE 8.

Referring now to FIGURES 8 and 9, the details of the forward carriage are illustrated.

The forward carriage 30 comprises generally a suitable frame structure 134 to which the wheels 130 are secured and which ride on the track 132. The frame structure 134 carries a suitable prime mover 136, here illustrated as an electric motor, which drives the hydraulic pump 138 for providing hydraulic pressure from the hydraulic tank 140 to the hydraulic motors 142 which provide a drive for one of the rollers 126 through the drive linkage 144. Hydraulic pressure is also applied to the hydraulic motor 146 which drives the wheels 130 through the gear reduction or speed reducer 148 by means of the drive belts 150 and 152. Hydraulic pressure is also supplied from the tank 140 to the hydraulic cylinder arrangement 154 to which is secured the roll off bar 156 pivoted at its other end by the pivot connection 158 to the frame member 134 so that as the piston of the hydraulic cylinder 154 is raised and lowered it raises and lowers that end of the roll off bar 156 causing the pipe to roll off the rollers 126 and the carriage 30.

Suitable connections and controls are provided, which are not shown, so that hydraulic power is provided to the various hydraulic motors from the hydraulic tank 140 and returned. Also, a seat 160 is provided for an operator to ride on the carriage 30 and to control the operation of the various elements.

An endless chain 162 is attached to the forward and rearward ends of the forward carriage 30 to provide movement of the rearward carriage 32 as presently described.

Figure 13:
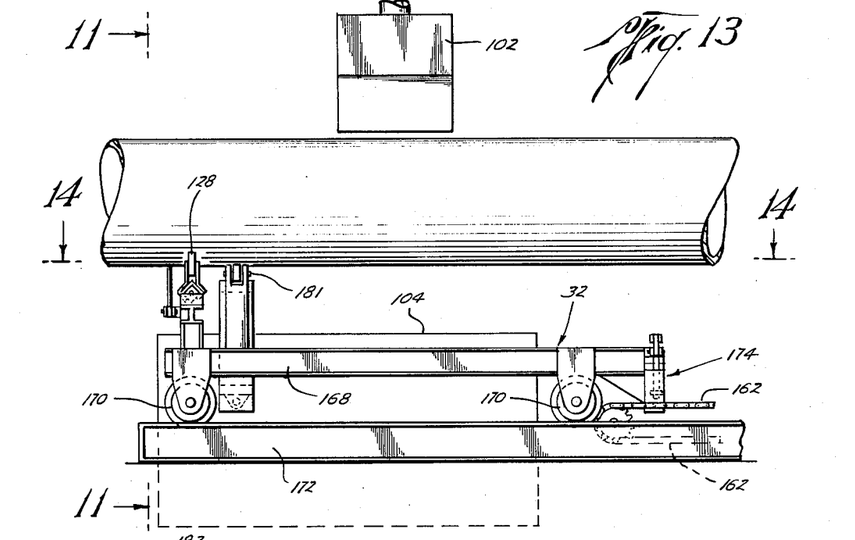
FIGURE 13 is a side elevational view of the rearward carriage taken along the line 13—13 of FIGURE 11.
Figure 14:
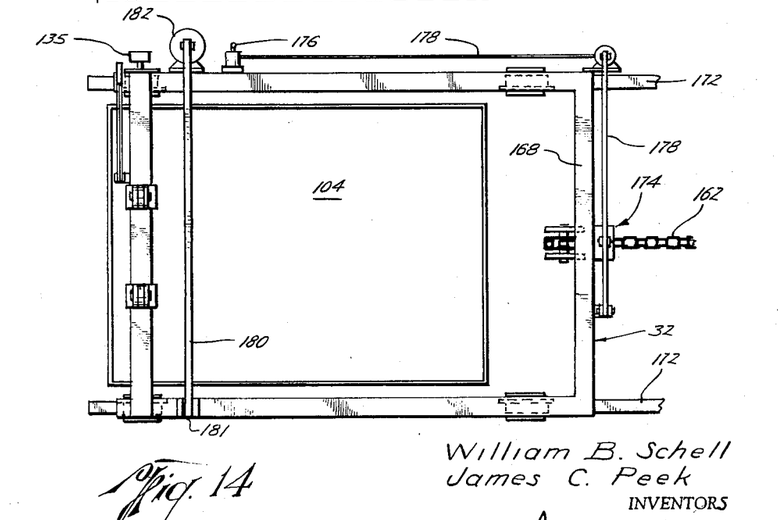
FIGURE 14 is a plan view of the rearward carriage taken along the line 14—14 of FIGURE 13.

The details of a presently preferred rearward carriage are best illustrated in FIGURES 13 and 14, to which reference is now made. The rearward carriage 32 comprises a generally rectangular frame 168 to which the wheels 170 are secured to travel on the track 172 and provide a generally central open space so that excess coating material from the coating head 102 flowing onto the pipe falls into the sump 104.

A pair of rollers 128 are provided on the rearward portion of the rearward carriage 32 so that the trailing end of the pipe 10 rests on these rollers and is supported along with the power driven rollers 126 as the pipe 10 leaves the treating station and is moved to the unloading and inspection ramp 34.

In order to provide movement of the rearward carriage 32, a chain clamp 174 operated by the hydraulic piston and cylinder arrangement 176 through the linkage 178 is provided to clamp the cable 162 so that the chain moves it with the forward carriage 30. Thus, upon actuating the arrangement 176, the rearward carriage 32 is moved forwardly or rearwardly as desired. Any desired type cable clamp may be utilized.

A pipe roll off bar 180 is provided which is pivoted at one side by the pivot connection 181 to the frame members 168 and is secured to the hydraulic piston and cylinder arrangement 182 for the purpose of raising and lowering the roll off bar 180 for unloading the pipe.

Figure 10:
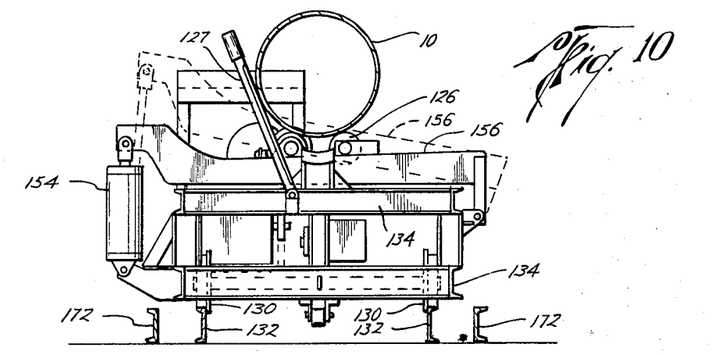
FIGURE 10 is an end view of the forward carriage taken along the line 10—10 of FIGURE 9.
Figure 11:
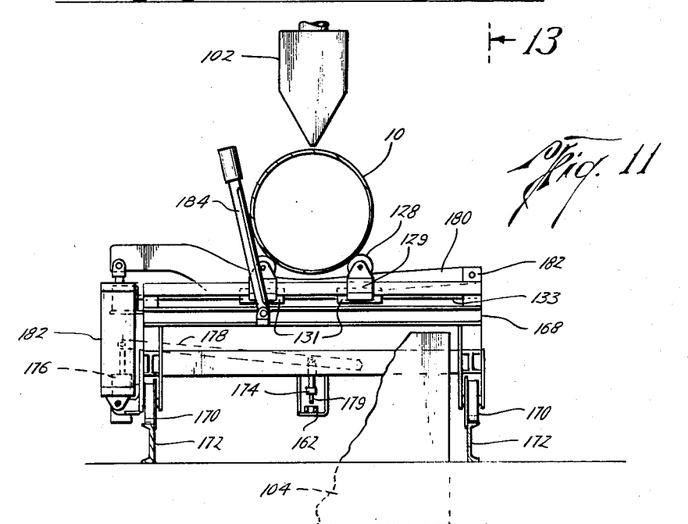
FIGURE 11 is an end view of the rearward carriage taken along the line 11—11 of FIGURE 13.

The roll off bars and their operation is best illustrated for the forward carriage in FIGURE 10 and the rearward carriage in FIGURE 11. Thus, as the roll off bars 156 of the forward carriage 30 and 180 of the rearward carriage 32 are actuated, the pipe is rolled off the power driven rollers 126 of the forward carriage 30 and the rollers 128 of the rearward carriage 32 onto the loading ramp, cooling board and inspection platform as illustrated in FIGURE 1. Suitable controls for this purpose are provided, which are not illustrated, as these are conventional and are omitted to simplify the disclosure.

The chain clamping mechanism 174 is best illustrated in FIGURE 11 and it is shown as a hydraulic piston and cylinder arrangement 176, although it may be pneumatic, which actuates the linkage 178 raising and lowering the projection 179 into and out of engagement with the chain 162.

Figure 12:
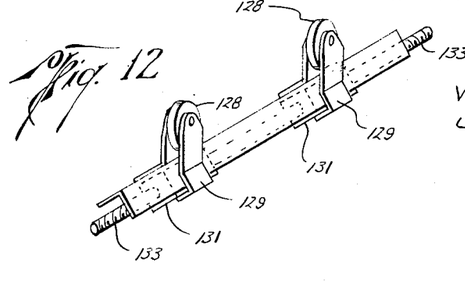
FIGURE 12 is a fragmentary perspective view illustrating a means for moving the pipe engaging rollers to avoid treating material falling on these rollers and clogging them.

As best seen in FIGURE 5, in operation the rollers 128 of carriage 132 are moved under the coating head 102 during the forward and backward travel. During the forward travel, a shield, not shown, is positioned closely adjacent to the pipe 10 which prevents excess coating material from getting on the rollers 128 and interfering with their movement. On their rearward travel, however, the shield does not prevent the coating material from flowing onto these rollers and means are provided to prevent this from happening. For this purpose, and as best seen in FIGURES 11 and 12, the rollers 128 are secured by the brackets 129 to the blocks 131 which receive the screw 133. Thus, upon rotation of the screw 133 the rollers 128 are moved outwardly so that they may pass under but outside of the material treating head 102 and be moved back in under and engage the trailing end of the pipe 10. For this purpose, a pneumatic or hydraulic motor, not shown, is provided which is supplied pneumatic or hydraulic pressure by suitable lines, not shown, and controlled by a suitable control, also not shown in order to simplify the disclosure.

In the operation of the presently preferred apparatus according to the invention, and referring first to FIGURE 1, the ends of the pipe 10 are plugged and the pipe is cleaned by conveying it through the heat blasting station 14 and sand, shot or grit blasting station 16 to the priming station 18 where it is primed. As best seen in FIGURE 2 the cleaned and primed pipe is conveyed by the conveyor 36 to the elevator 20 where the pipe 10 is elevated to the drying ramp 22 where it is dried and the plugs 12 are removed. The pipe 10 is then conveyed by the conveyor 68 to the treating station 24.

Figure 6:
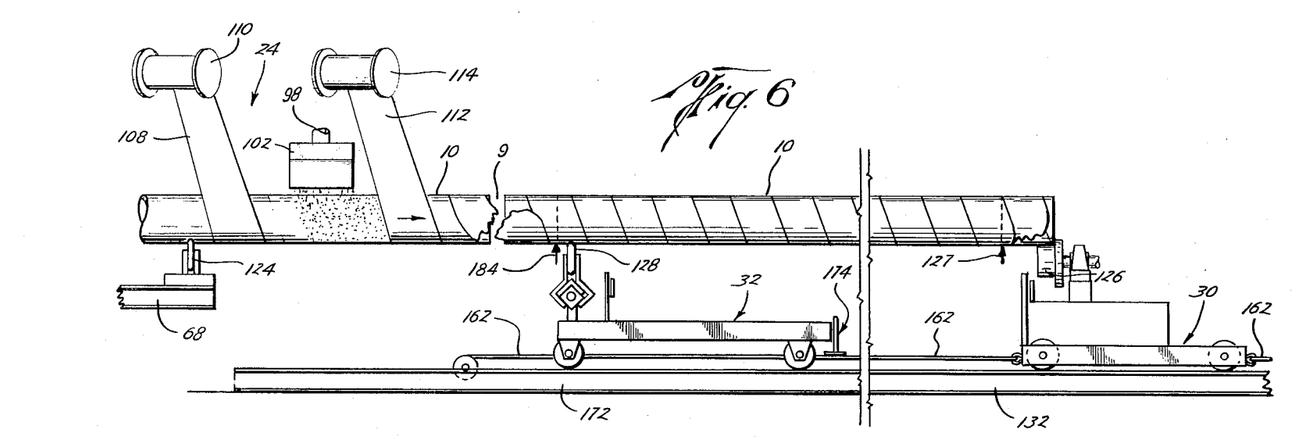
FIGURE 6 is a diagrammatic side elevational view illustrating the pipe after it has been coated and wrapped and is being moved to the inspection and discharge ramp by the forward and rearward carriages.
Figure 7:
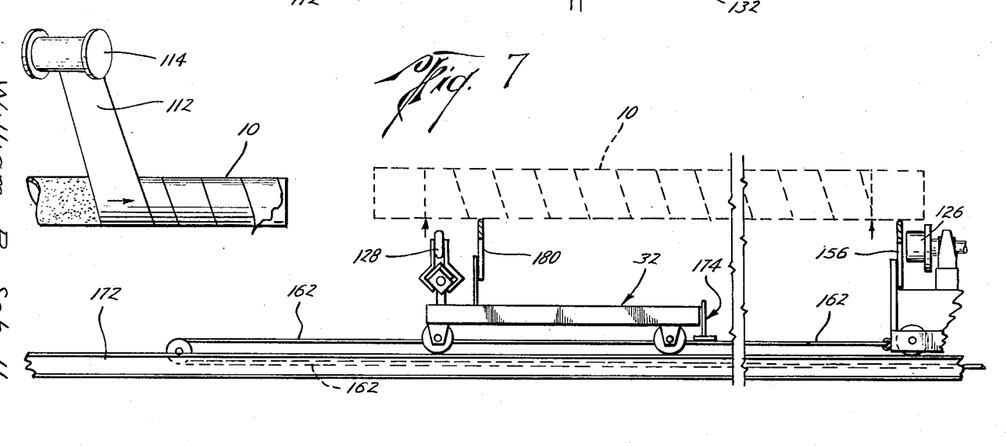
FIGURE 7 is a view similar to that of FIGURE 6 illustrating the coated and wrapped pipe as it is being rolled off the forward and rearward carriages for inspection and loading.

As best seen in FIGURES 4 and 5 the pipe is moved forwardly and rotated by the discs 84 through the treating station 24 where it is treated, such as applying the fiber glass 103, a liquid coating and a wrapping 112. Obviously, any desired number and type of coatings and wrappings and order thereof may be applied as specified or desired. The excess of the liquid coating falls into the sump 104 through the central portion of the rearward carriage 32 and the forward end of the treated and wrapped pipe 10 engages the power driven rollers 126 on the forward carriage 30. As best seen in FIGURES 6 and 7, as a section of coated and wrapped pipe 10 passes through the treating station 24 it is no longer rotated by the discs 84 (FIGURE 4) but is rotated by the power driven rollers 126 which rotate and support the leading end of the pipe 10 and the trailing end of the pipe 10 is supported on the rollers 128 on the rearward carriage 32.

As shown in FIGURES 6 and 7, the chain clamp 174 has been engaged so that the rearward carriage 32 moves forward with the forward carriage 30 supporting the trailing end of the coated and wrapped section of pipe 10.

It is noted that the sections of pipe 10 pass through the coating and wrapping station 24 in end to end abutting relationship without any coupling elements and are wrapped as one continuous pipe, the wrapping being broken as indicated at 9 to permit separation of the pipe lengths into their respective sections and permit rapid movement of the coated and wrapped section of pipe 10 to the loading and inspection station 34 (FIGURE 1).

Each of the carriages 30 and 32 carry a knife, the forward carriage 30 carrying an adjustably mounted knife 127 and the rearward carriage 32 also carrying an adjustably mounted knife 184, which knives are shown in detail in FIGURES 10 and 11 and are shown as pivoted to the respective frame members of these carriages. These knives are shown by the heavy lines and arrows in FIGURES 6 and 7.

The operators move these knives into engagement with the ends of the pipe adjacent thereto to cut away a portion of the wrapping so that sections of the pipe may be secured together at their ends in use, such as by welding. This is readily accomplished by engaging the knives 127 and 184 with the pipe as it is being rotated by the driven rollers 126.

As best seen in FIGURES 10 and 11, the roll off bars 156 and 180 on the forward carriage 30 and rearward carriage 32 are actuated which causes the coated and wrapped pipe 10 to roll over onto the inspection and discharge ramp 34 (FIGURE 1).

The controls are actuated reversing the direction of the forward carriage 30 and thus the chain 162 thereby moving the carriages 30 and 32 into the initial starting position. The controls are also actuated to move the rollers 128 (FIGURE 11) apart on the rearward carriage 32 so that they pass under but outside the dripping from the liquid coating head 102. Once beyond this point, the rollers 128 are moved inwardly toward one another until they engage and support the pipe 10. The next succeeding section of pipe 10 will have moved partially through the treating station and is engaged by the rollers 126 and the cycle is repeated.

Thus, the apparatus permits of a continuous process of treating pipe as it is spiraled through a treating station for coating or wrapping the pipe or both in which it is unnecessary to couple the sections of pipe together in end to end relationship thereby avoiding the time and expense of utilizing and inserting and removing these coupling elements which damage the pipe and which materially delay and materially increase the cost of coating and wrapping pipe.

The method of the invention has been described in connection with the presently-preferred apparatus of the invention. In general, however, the method comprises conveying sections of pipe in end to end relationship through a pipe treating station, imparting a spiraling motion to a section of pipe as it goes through the station by suitable means behind the station, engaging the forward end of the pipe emerging from the treating station and rotating that forward end of the pipe in synchronization with the means for spiraling the pipe at the rearward portion, engaging and supporting the treated section of pipe at its rearward portion and conveying it to a suitable cooling, loading or inspection or discharge station. This is accomplished without coupling the sections of pipe in end to end relationship but is accomplished by passing successive sections of pipe through the treating station in end to end abutting relationship and rotating the forward end of the leading section after it has passed the means for rotating the pipe at the rearward side of the treating station.

At the treating station, any desired treatment of the pipe may be made. For example, the pipe may be either wrapped or coated or both. Examples of various coatings are coal tars, asphalt enamels, paints, resins, various mixtures thereof, for example, the combination of coal tar and resins.

Various synthetic materials, glass fibers and the like may be applied to the pipe as well as various wrappings, such as asbestos felt, either of the coal tar or asphalt saturated type, pipe line felts, plastic felts and the like. Several coatings and wrappings or any variation thereof may be utilized as desired.

As previously mentioned the time required to treat pipe in which pipe is spiraled through a treating station is materially reduced by the present method and apparatus, damaging of the inner ends of the pipe is eliminated, coupling elements are eliminated and manpower requirements are materially reduced.

The present invention, therefore, is well adapted and suited to carry out the objects and attain the advantages and ends mentioned as well as others inherent therein.

Various changes may be made in the process and in the details of construction and arrangement of parts in the apparatus which are within the spirit of the invention as encompassed within the scope of the appended claims.

We claim:

1. Apparatus for treating pipe comprising, a treating station, means disposed adjacent the rearward portion of the treating station for spiraling successive lengths of the pipe through the treating station in end to end abutting relationship, means at the treating station continuously applying treating material to the entire lengths and abutted ends of the pipe, a carriage disposed at the forward side of the treating station, rollers on the carriage engageable with and supporting the leading ends of the lengths of pipe as they emerge from the treating station, and means to rotate at least one of the rollers for rotating the pipe, said means being synchronized with said first-mentioned means.

2. Apparatus for treating pipe comprising a treating station, means disposed adjacent the rearward portion of the treating station for spiraling successive lengths of the pipe through the treating station in end to end abutting relationship, means at the treating station continuously applying treating material to the entire lengths and abutted ends of the pipe, a forward carriage disposed at the forward side of the treating station, rollers on the forward carriage engageable by the leading end of the pipe emerging from the treating station for supporting the pipe, means to rotate at least one of the rollers for rotating the pipe, and a rearward carriage disposed on the forward side of the treating station and behind the forward carriage, said rearward carriage including rollers engageable by and supporting the trailing end of the pipe as it emerges from the treating station, said forward and rearward carriages being arranged for reciprocating movement to and from the forward side of the treating station.

3. The apparatus of claim 2 including track means, said carriages being disposed on said track means, a cable connected to said forward carriage, driving means for moving the forward carriage, and engageable clamp means on the rearward carriage for engaging and clamping the cable for movement of the rearward carriage.

4. Apparatus for coating and spirally wrapping successive abutted lengths of pipe in end to end abutting relationship comprising, a coating and wrapping station, means for continuously applying a coating material to said abutted lengths of pipe at said station, wrapping means disposed at said station for continuously wrapping said abutted and coated lengths of pipe, means disposed adjacent the rearward side of the station for spiraling the lengths of pipe through the station in said end to end abutting relationship thereby providing even distribution of the coating material about the pipe and spiral wrapping of the wrapping material about the abutted lengths of pipe, a forward carriage disposed at the forward side of the station, rollers on the forward carriage engageable by and supporting the leading end of the pipe emerging from the station, means to rotate at least one of the rollers for rotating the pipe, said rotating means being synchronized with said spiraling means, and a rearward carriage disposed at the station and under the means for applying coating material to the pipe, said rearward carriage comprising a generally rectangular body, a pair of rollers carried by the body, said rollers arranged to engage the trailing end of the pipe emerging from the station, said rollers arranged for movement to and away from one another in a direction generally normal to the axis of the pipe, means carried by the body for moving said rollers to and away from one another as aforementioned, and means for moving the carriages and thereby the pipe forwardly away from the station.

5. Apparatus for coating and wrapping pipe comprising, a coating and wrapping station, means disposed adjacent the rearward portion of the coating and wrapping station for spiraling the pipe through said station in end to end abutting relationship, a forward carriage disposed at the forward side of the coating and wrapping station, rollers on the forward carriage engageable by the leading end of the pipe for supporting the pipe as it emerges from the coating and wrapping station, means to rotate at least one of the rollers for rotating the pipe, a rearward carriage disposed on the forward side of the coating and wrapping station and behind the forward carriage, said rearward carriage including rollers engageable by the supporting the trailing end of the pipe as it emerges from the coating and wrapping station, and knife means on each carriage for cutting away coatings and wrappings applied to the pipe adjacent each end thereof.

6. A method of treating pipe comprising, continuously conveying successive lengths of pipe in end to end abutting relationship through a treating station by applying a conveying force to at least one of the lengths of pipe rearwardly of the treating station, rotating the lengths of pipe by applying a rotating force to at least one of the lengths of pipe rearwardly of the treating station, rotating the pipe after it has passed the rotating force rearwardly of the treating station by applying a rotating force to the pipe forwardly of the treating station, and continuously treating the entire lengths and abutted ends of the pipe as they rotate and are conveyed through the treating station.

7. A continuous method of coating and wrapping successive lengths of pipe comprising, conveying the successive lengths of pipe in end to end abutting relationship through a coating and wrapping station by applying a conveying force to at least one of said lengths of pipe rearwardly of the coating and wrapping station, rotating the pipe by applying a rotating force to each of said successive lengths of pipe rearwardly of the coating and wrapping station as it passes therethrough, continuously coating and wrapping the entire lengths and abutted ends of said successive lengths of pipe while being rotated and conveyed through the coating and wrapping station, applying an additional rotating force to the lengths of pipe emerging from and forwardly of the coating and wrapping station thereby rotating said successive lengths of pipe after they are no longer rotated by the rotating force rearwardly of the station, conveying the coated and wrapped pipe forwardly away from the coating and wrapping station, and separating and cutting away the wrapping from the abutted ends of the successive lengths of pipe after passing through said station.

8. An apparatus for wrapping pipe comprising conveyor means for receiving a plurality of axially aligned pipes in end to end abutting relationship, said conveyor means comprising a plurality of rollers disposed generally below and on opposite sides of said pipes for receiving said pipes therebetween, said rollers being placed at spaced intervals along said conveyor and at a uniform angle other than perpendicular with respect to the centerline of said pipes so as to urge said pipes in a single axial direction upon rotation of said rollers, coating and wrapping means positioned at a fixed location with respect to said conveyor for applying a protective coating to said pipes as said pipes move axially thereby with the horizontal axes thereof at a predetermined elevation, driving means located ahead of said coating and wrapping means comprising a plurality of discs disposed on opposite sides of said pipes, said discs being disposed angularly with respect to said pipes so as to engage said pipes with only an arcuate portion of each of said discs in order to impart rotative motion to said pipes and said rollers, carrier means for receiving said pipes as they are driven in abutting relationship by said driving means through said coating and wrapping means, said carrier means comprising first and second carrier assemblies located posterior to said coating and wrapping means, said first carrier assembly comprising a truck portion mounted on wheels and containing a plurality of variably positioned rollers for at times engaging only the rear end of a single one of said pipes, said second carrier assembly comprising a body, wheel and axle assemblies supporting said body, motor and transmission means connected to at least one of said wheel and axle assemblies for providing a motivating force to said body, a plurality of rotatable rollers mounted on said body in a manner so as to have the centerline of said rollers substantially parallel to said centerline of said pipe, first and second diameter portions formed on one of said rollers in a manner so as to form a generally radially extending shoulder portion, said first diameter portion being sufficiently small as to provide clearance between the surface thereof and the outer diameter of said pipe as said pipe is fed through said coating and wrapping means, said second diameter portion being sufficiently large as to cause said pipe to abut against said shoulder as said pipe is fed through said coating and wrapping means, said clearance enabling said second carrier to be positioned in pipe-receiving-position while maintaining the predetermined elevation of said pipe and said second carrier, and additional transmission means operatively connected to said motor means for rotating at least one of said rollers.

9. An apparatus for wrapping pipe comprising conveyor means for receiving a plurality of axially aligned pipes in end to end abutting relationship, said conveyor means comprising a plurality of rollers disposed generally below and on opposite sides of said pipes for receiving said pipes therebetween, said rollers being placed at spaced intervals along said conveyor and at a uniform angle other than perpendicular with respect to the centerline of said pipes so as to urge said pipes in a single axial direction upon rotation of said rollers, coating and wrapping means positioned at the fixed location with respect to said conveyor for applying a protective coating to said pipes as said pipes move axially thereby, driving means located ahead of said coating and wrapping means comprising a plurality of discs disposed on opposite sides of said pipes, said discs being disposed angularly with respect to said pipes so as to engage said pipes with only an arcuate portion of each of said discs in order to impart rotative motion to said pipes and said rollers, carrier means for receiving said pipes as they are driven in abutting relationship by said driving means through said coating and wrapping means, said carrier means comprising first and second carrier assemblies located posterior to said coating and wrapping means, said first carrier assembly comprising a truck portion mounted on wheels and containing a plurality of variably positioned rollers for at times engaging only the rear end of said pipe, said second carrier assembly comprising a body, wheel and axle assemblies supporting said body, motor and transmission means connected to at least one of said wheel and axle assemblies for providing a motivating force to said body, a plurality of rotatable rollers mounted on said body in a manner so as to have the centerline of said rollers substantially parallel to said centerline of said pipe, said rollers having a diameter sufficiently small as to provide clearance between the surface thereof and the outer diameter of said pipe as said pipe is fed through said coating and wrapping means, and additional transmission means operatively connected to said motor means for rotating at least one of said rollers.

10. Apparatus for treating pipe comprising a treating station, means disposed adjacent the rearward side of the treating station for conveying successive lengths of the pipe to the treating station in end to end abutting relationship, means at the treating station for applying treating material to the lengths of the pipe, means disposed adjacent the rearward side of the treating station for rotating the pipe, and means disposed adjacent the forward side of the treating station for engaging and supporting the leading end of the pipe and rotating the pipe after it emerges from the treating station.

11. Apparatus for treating pipe comprising a treating station, first means disposed rearwardly of the treating station for conveying successive lengths of the pipe to the treating station in end to end abutting relationship, and second means disposed forwardly of the treating station engageable by the leading end of the pipe for rotating the pipe after the pipe has passed said first means.

References Cited in the file of this patent

UNITED STATES PATENTS

| | | |
|---|---|---|
| 1,807,869 | Okey | June 2, 1931 |
| 2,112,865 | Putnam | Apr. 5, 1938 |
| 2,166,609 | Putnam | July 18, 1939 |
| 2,763,236 | Cummings | Sept. 18, 1956 |